(12) United States Patent
Yazawa et al.

(10) Patent No.: US 11,972,902 B2
(45) Date of Patent: Apr. 30, 2024

(54) ELECTRONIC APPARATUS WITH A METAL TERMINAL HAVING PORTIONS OF DIFFERING ELASTICITY

(71) Applicant: TDK CORPORATION, Tokyo (JP)

(72) Inventors: Kosuke Yazawa, Tokyo (JP); Masatsugu Yamamoto, Tokyo (JP); Yosuke Kobayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 28 days.

(21) Appl. No.: 17/902,359

(22) Filed: Sep. 2, 2022

(65) Prior Publication Data
US 2023/0097139 A1 Mar. 30, 2023

(30) Foreign Application Priority Data
Sep. 28, 2021 (JP) .................................. 2021-157495

(51) Int. Cl.
*H01G 4/232* (2006.01)
*H01G 2/06* (2006.01)
*H01G 4/30* (2006.01)

(52) U.S. Cl.
CPC ........... *H01G 4/2325* (2013.01); *H01G 2/065* (2013.01); *H01G 4/30* (2013.01)

(58) Field of Classification Search
None
See application file for complete search history.

(56) References Cited

U.S. PATENT DOCUMENTS

| 6,046,902 | A  | * | 4/2000 | Nakagawa | H01G 4/232 |
| | | | | | 361/309 |
| 6,191,933 | B1 | * | 2/2001 | Ishigaki | H05K 3/3426 |
| | | | | | 361/309 |
| 6,201,683 | B1 | * | 3/2001 | Yamada | H01G 4/232 |
| | | | | | 361/309 |
| 6,515,844 | B1 | * | 2/2003 | Moriwaki | H01G 2/065 |
| | | | | | 361/306.3 |
| 7,331,799 | B1 | * | 2/2008 | Lee | H01G 4/232 |
| | | | | | 361/308.1 |

(Continued)

FOREIGN PATENT DOCUMENTS

| CN | 1906718 | A | * | 1/2007 | .......... H01G 4/1227 |
| CN | 111199993 | A | * | 5/2020 | ............. H01L 27/32 |

(Continued)

*Primary Examiner* — Timothy J. Dole
*Assistant Examiner* — Muhammed Azam
(74) *Attorney, Agent, or Firm* — Oliff PLC

(57) ABSTRACT

An electronic component with a metal terminal includes a plurality of electronic components each including an element body and a pair of external electrodes provided on each of a pair of end surfaces facing each other in an X direction in the element body, and disposed in a Y direction, and a pair of plate-shaped metal terminals each including a plurality of joint portions to which external electrodes of the plurality of electronic components are joined, and a leg portion provided to protrude further than the electronic component in a Z direction, wherein a portion of the metal terminal that extends in the Y direction to straddle the plurality of joint portions is an easily deformable portion made of a second metal material having a Young's modulus smaller than that of a first metal material constituting the other portion.

11 Claims, 13 Drawing Sheets

(56) References Cited

U.S. PATENT DOCUMENTS

| | | | | |
|---|---|---|---|---|
| 7,362,559 B2 * | 4/2008 | Tominaga | | H01G 4/232 |
| | | | | 361/321.1 |
| 7,365,957 B2 * | 4/2008 | Togashi | | H01G 2/065 |
| | | | | 361/308.1 |
| 8,570,708 B2 * | 10/2013 | Itagaki | | H01G 4/232 |
| | | | | 361/321.1 |
| 9,520,244 B2 * | 12/2016 | Park | | H01G 4/30 |
| 10,559,426 B2 * | 2/2020 | Ando | | H01G 4/2325 |
| 10,770,236 B2 * | 9/2020 | Kim | | H01G 4/1209 |
| 10,923,277 B2 * | 2/2021 | Ritter | | H01G 4/30 |
| 11,297,721 B2 * | 4/2022 | Belman | | B23K 1/0016 |
| 11,373,807 B2 * | 6/2022 | Takizawa | | H01G 4/232 |
| 11,527,364 B2 * | 12/2022 | Tahara | | H01G 2/065 |
| 2005/0041367 A1 * | 2/2005 | Yoshii | | H01G 4/228 |
| | | | | 361/303 |
| 2009/0260436 A1 * | 10/2009 | Tochi | | G01C 19/5642 |
| | | | | 73/504.12 |
| 2009/0296311 A1 * | 12/2009 | Otsuka | | H01G 4/2325 |
| | | | | 361/306.3 |
| 2010/0123995 A1 * | 5/2010 | Otsuka | | H01G 4/228 |
| | | | | 361/308.1 |
| 2014/0055910 A1 * | 2/2014 | Masuda | | H01G 4/232 |
| | | | | 361/303 |
| 2015/0114697 A1 * | 4/2015 | Murrell | | H01L 23/49861 |
| | | | | 174/255 |
| 2015/0131202 A1 * | 5/2015 | Masuda | | H01G 4/30 |
| | | | | 361/301.4 |
| 2015/0187495 A1 * | 7/2015 | Maeda | | H01G 4/30 |
| | | | | 361/303 |
| 2016/0260546 A1 * | 9/2016 | Mori | | H01G 2/06 |
| 2016/0336114 A1 * | 11/2016 | Nishimura | | H01G 4/12 |
| 2016/0351333 A1 * | 12/2016 | Ando | | H01G 2/14 |
| 2017/0076870 A1 * | 3/2017 | Noda | | H01G 4/232 |
| 2017/0186539 A1 * | 6/2017 | Masuda | | H01G 2/06 |
| 2017/0287645 A1 * | 10/2017 | Masuda | | H01G 4/248 |
| 2018/0033556 A1 * | 2/2018 | Itamochi | | H01C 7/003 |
| 2018/0197681 A1 * | 7/2018 | Ando | | H01G 4/232 |
| 2018/0211784 A1 * | 7/2018 | Ando | | H01G 2/06 |
| 2019/0080841 A1 * | 3/2019 | Ando | | H01G 4/232 |
| 2019/0080842 A1 * | 3/2019 | Ando | | H01G 4/30 |
| 2019/0164694 A1 * | 5/2019 | Ando | | H01G 4/12 |
| 2019/0304689 A1 * | 10/2019 | Ando | | H01G 4/232 |
| 2019/0304691 A1 * | 10/2019 | Ando | | H01G 4/38 |
| 2019/0326058 A1 * | 10/2019 | Lee | | H01G 4/232 |
| 2020/0043652 A1 * | 2/2020 | Ando | | H01G 4/228 |
| 2021/0139317 A1 * | 5/2021 | Pahl | | B81B 3/0021 |
| 2021/0272757 A1 * | 9/2021 | Aburakawa | | H01L 23/49822 |

FOREIGN PATENT DOCUMENTS

| | | | | | |
|---|---|---|---|---|---|
| CN | 112782825 | A | * | 5/2021 | ......... G02B 13/0065 |
| CN | 214097921 | U | * | 8/2021 | ......... G02B 13/0065 |
| JP | S62-213266 | A | | 9/1987 | |
| JP | 2000049046 | A | * | 2/2000 | ............ H01C 1/028 |
| JP | 2001085262 | A | * | 3/2001 | ............ H01G 2/14 |
| KR | 20170017137 | A | * | 2/2017 | |
| KR | 20180097070 | A | * | 8/2018 | |
| WO | WO-2006057360 | A1 | * | 6/2006 | ............ H01L 24/03 |
| WO | WO-2010111575 | A3 | * | 1/2011 | ............ H01G 2/065 |
| WO | WO-2022158187 | A1 | * | 7/2022 | |
| WO | WO-2022158188 | A1 | * | 7/2022 | |

* cited by examiner

Fig.7

| | MATERIAL | YOUNG'S MODULUS (GPa) |
|---|---|---|
| FIRST METAL MATERIAL | STAINLESS STEEL | 197 |
| | IRON-NICKEL ALLOY (42 ALLOYS) | 145 |
| SECOND METAL MATERIAL | COPPER | 129.8 |
| | PHOSPHOR BRONZE | 110 |
| | BRASS | 98 |

ELECTRONIC APPARATUS WITH A METAL TERMINAL HAVING PORTIONS OF DIFFERING ELASTICITY

TECHNICAL FIELD

The present disclosure relates to an electronic component with a metal terminal.

BACKGROUND

Conventionally, electronic components with metal terminals in which a pair of metal terminals are provided on a pair of end surfaces of a chip-type electronic component such as a multilayer ceramic capacitor are known. In such electronic components, the metal terminals are used for mounting on a member to be connected such as a circuit board. For example, it is possible to realize an electrical connection of an electronic component to a member to be connected by bringing a tip end portion of a metal terminal protruding from the electronic component into contact with a mounting surface of the member to be connected and soldering the tip end portion of the metal terminal to the mounting surface.

As a conventional electronic component with a metal terminal, for example, there is a chip type electronic component described in Japanese Unexamined Patent Publication No. S62-21266. In this conventional electronic component, a plate-shaped metal terminal formed by performing a bending process along an outer surface of the electronic component is provided. A tip end of the metal terminal is bent at an acute angle toward the electronic component side with respect to a portion along the outer surface of the electronic component.

SUMMARY

When an electronic component with a metal terminal as described above is manufactured, for example, a joint portion between the electronic component and the metal terminal is soldered using a means such as a pressing head. However, when bending occurs in a frame constituting the metal terminal during this soldering, the contact between the pressing head and the metal terminal becomes insufficient, which may cause a poor joint between the electronic component and the metal terminal. In addition, in a case in which a configuration in which a plurality of electronic components are held between a pair of metal terminals is adopted, when dimensions in a direction in which the pair of metal terminals face each other vary among the electronic components, the contact between the pressing head and the metal terminal becomes insufficient as described above, which may cause a poor joint between the electronic components and the metal terminals.

The present disclosure has been made to solve the above problems, and an object thereof is to provide an electronic component with metal terminals capable of curbing having poor joints between the electronic component and the metal terminals.

An electronic component with metal terminals according to one aspect of the present disclosure includes a plurality of electronic components each including an element body and a pair of external electrodes provided on each of a pair of end surfaces facing each other in a first direction in the element body, and disposed in a second direction orthogonal to the first direction, and a pair of plate-shaped metal terminals each including a plurality of joint portions to which external electrodes of the plurality of electronic components are joined, and a leg portion provided to protrude further than the electronic component in a third direction intersecting the first direction and the second direction, wherein a portion of the metal terminal that extends in the second direction to straddle the plurality of joint portions is an easily deformable portion made of a second metal material having a Young's modulus smaller than that of a first metal material constituting the other portion.

In the electronic component with a metal terminal, the portion of the metal terminal that extends in the second direction to straddle the plurality of joint portions is the easily deformable portion made of a metal material having a Young's modulus smaller than that of the other portion. Therefore, even though bending of a frame constituting the metal terminal occurs when the electronic component and the metal terminal are joined to each other, the easily deformable portion that straddles the plurality of joint portions is deformed by heating and pressing of a pressing head, and a shape of the joint portion can be fitted to a shape of the external electrode of the electronic component. Similarly, even though dimensions in a direction (the first direction) in which the pair of metal terminals face each other vary among the electronic components, the easily deformable portion that straddles the plurality of joint portions is deformed by the heating and pressing of the pressing head, and the shape of the joint portion can be fitted to the shape of the external electrode of the electronic component. Therefore, in the electronic component with a metal terminal, it is possible to suppress a poor joint between the electronic component and the metal terminal.

An electronic component with metal terminals according to one aspect of the present disclosure includes a plurality of electronic components each including an element body and a pair of external electrodes provided on each of a pair of end surfaces facing each other in a first direction in the element body, and disposed in a second direction orthogonal to the first direction, and a pair of plate-shaped metal terminals each including a plurality of joint portions to which external electrodes of the plurality of electronic components are joined, and a leg portion provided to protrude further than the electronic component in a third direction intersecting the first direction and the second direction, wherein a portion of the metal terminal that extends in the third direction along a boundary between the plurality of electronic components is an easily deformable portion made of a second metal material having a Young's modulus smaller than that of a first metal material constituting the other portion.

In the electronic component with a metal terminal, the portion of the metal terminal that extends in the third direction along the boundary between the plurality of electronic components is the easily deformable portion made of a metal material having a Young's modulus smaller than that of the other portion. Therefore, even though bending of a frame constituting the metal terminal occurs when the electronic component and the metal terminal are joined to each other, the easily deformable portion along the boundary between the plurality of electronic components is deformed by heating and pressing of the pressing head, and the shape of the joint can be fitted to the shape of the external electrode of the electronic component. Similarly, even though dimensions in a direction (the first direction) in which the pair of metal terminals face each other vary among the electronic components, the easily deformable portion along the boundary between the plurality of electronic components is deformed by heating and pressing of the pressing head, and the shape of the joint can be fitted to the shape of the external electrode of the electronic component. Therefore, in the electronic component with a metal terminal, it is possible to suppress a poor joint between the electronic component and the metal terminal.

The metal terminal may have at least one protrusion that protrudes in the first direction toward the electronic component side in a region corresponding to the easily deformable portion. In this case, for the electronic component of which the dimension in the direction (the first direction) in which the pair of metal terminals face each other are larger than that of other electronic components, the protrusion is crushed during the heating and pressing of the pressing head, and thus the shape of the joint can be more reliably fitted to the shape of the external electrode of the electronic component.

The metal terminal may have at least one through hole in a region corresponding to the easily deformable portion to expose a part of the external electrode bonded to the joint portion. In this case, whether or not the shape of the joint portion is fitted to the shape of the external electrode of the electronic component can be visually recognized through the through hole.

The metal terminal may have a pair of arm portions that sandwich the electronic component in the third direction, and in the pair of arm portions, the arm portion located on a side opposite to the leg portion may be the easily deformable portion. In this case, due to the pair of arm portions, it is possible to stably hold the electronic component on the metal terminal. Further, since the arm portion located on the side opposite to the leg portion serves as the easily deformable portion, the shape of the joint portion can be more reliably fitted to the shape of the external electrode of the electronic component when the arm portion is provided.

The other portion may be a portion including the leg portion. In this case, strength of the metal terminal can be sufficiently maintained even when the easily deformable portion is provided.

The Young's modulus of the first metal material may be 140 GPa or more, and the Young's modulus of the second metal material may be less than 140 GPa. In this case, it is possible to easily ensure both an amount of deformation of the easily deformable portion and strength of the metal terminal.

The first metal material may be an iron-based alloy, and the second metal material may be copper or a copper-based alloy. In this case, it is possible to easily ensure both the amount of deformation of the easily deformable portion and the strength of the metal terminal.

BRIEF DESCRIPTION OF THE DRAWINGS

FIG. 7 is a diagram showing a configuration example of a first metal material and a second metal material and a Young's modulus.

DETAILED DESCRIPTION

Hereinafter, exemplary embodiments of an electronic component with a metal terminal according to one aspect of the present disclosure will be described in detail with reference to the drawings.

First Embodiment

Figure 1:
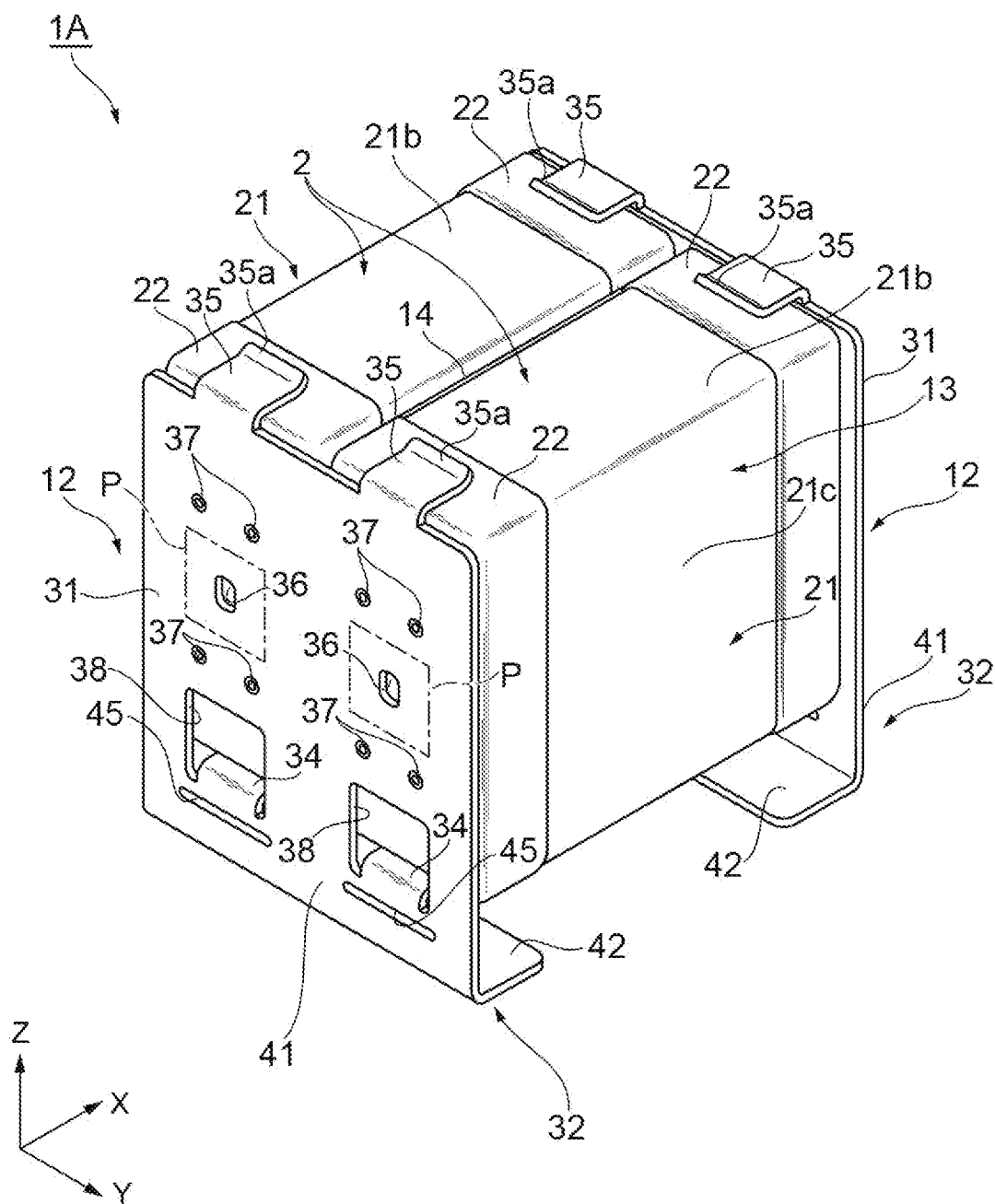
FIG. 1 is a perspective view showing a first embodiment of an electronic component with a metal terminal according to one aspect of the present disclosure.
Figure 2:
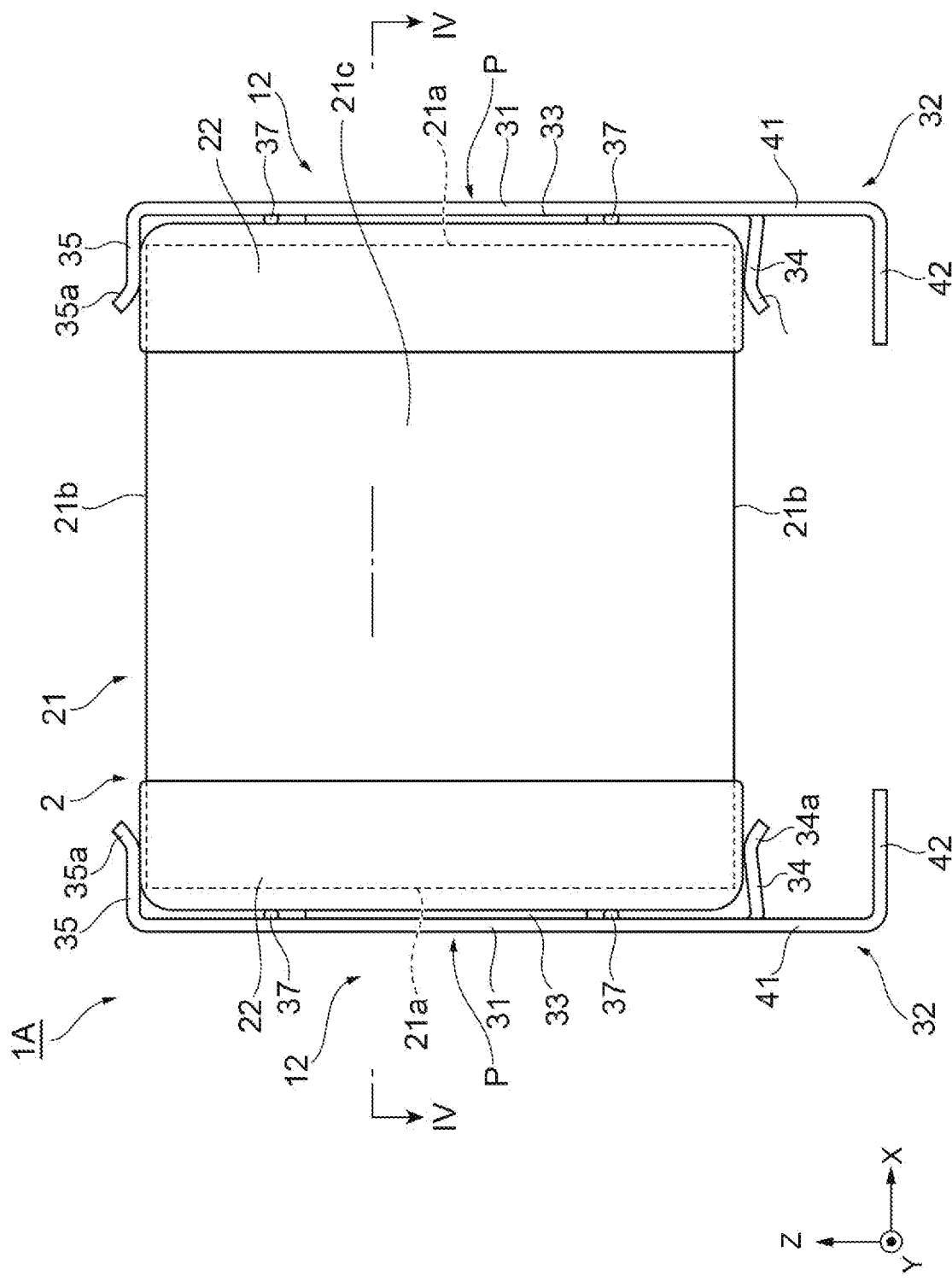
FIG. 2 is a side view of FIG. 1.
Figure 3:
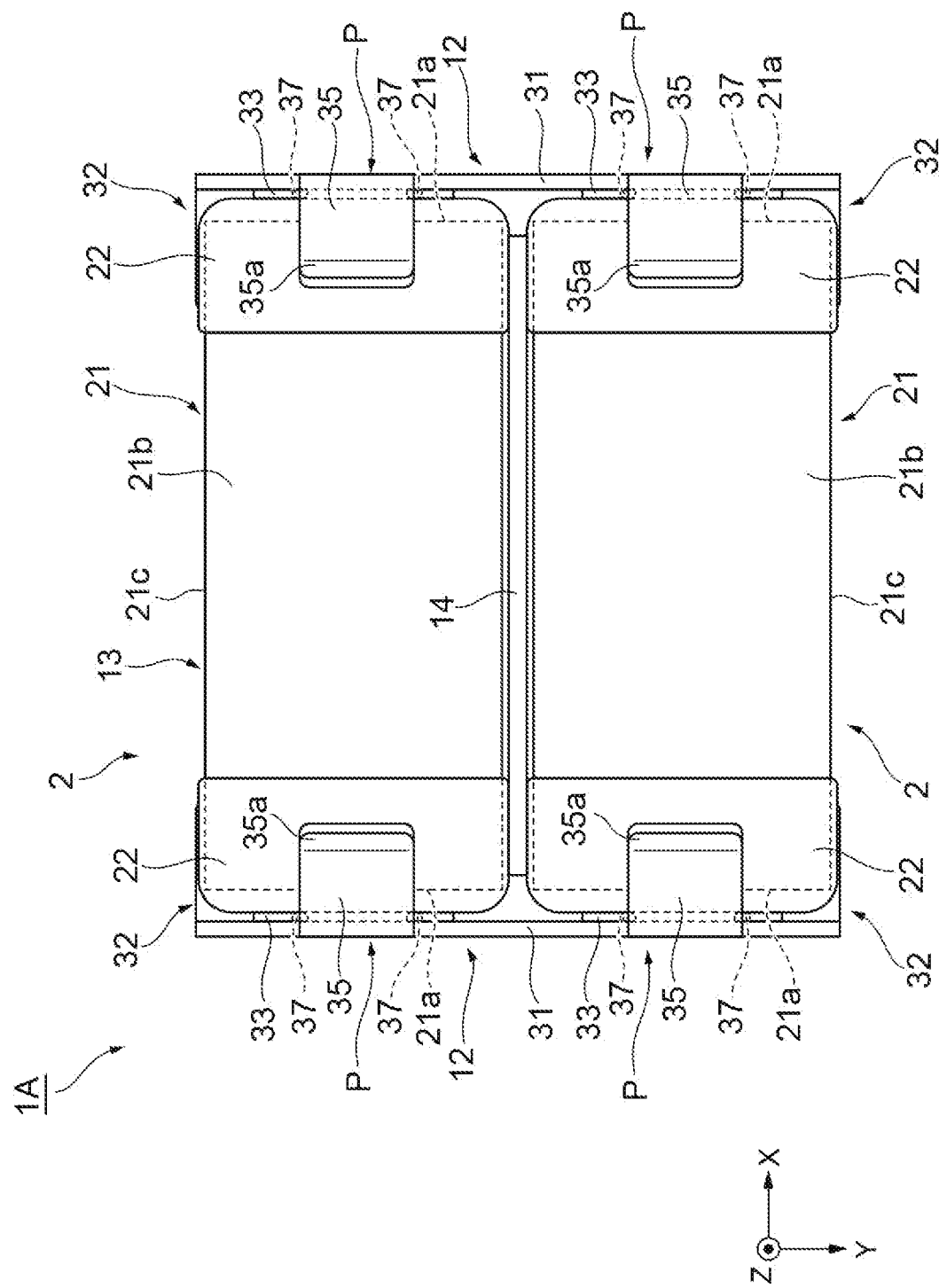
FIG. 3 is a plan view of FIG. 1.

FIG. 1 is a perspective view showing a first embodiment of an electronic component with a metal terminal according to one aspect of the present disclosure. FIG. 2 is a side view of FIG. 1, and FIG. 3 is a plan view of FIG. 1. The electronic component 1A with a metal terminal shown in FIGS. 1 to 3 has an aspect in which a plurality of electronic components 2 are held by a pair of plate-shaped metal terminals 12 and 12. In the present embodiment, the electronic component 1A with a metal terminal has an array 13 including two electronic components 2.

The pair of metal terminals 12 and 12 are disposed to face each other in a direction orthogonal to the arrangement direction of the electronic components 2 in the array 13. The array 13 includes the electronic components 2 and 2 adjacent to each other in a Y direction, and an insulating member 14 (refer to FIGS. 1 and 3) disposed between the electronic components 2 and 2. The electronic component 2 is a chip-type electronic component such as a multilayer ceramic capacitor. A member (not shown) to be connected on which the electronic component 2 is mounted is, for example, another electronic component, a circuit member, a printed circuit board, or the like. In the following description, a facing direction of the pair of metal terminals 12 and 12 is an X direction (a first direction), an arrangement direction of the electronic component 2 in the array 13 is a Y direction (a second direction), and an extending direction of the metal terminal 12 is a Z direction (a third direction). Further, for convenience of explanation, a top and a bottom may be referred to based on a top and a bottom on a paper surface of FIGS. 1 to 3.

As shown in FIGS. 1 to 3, the electronic component 2 includes an element body 21 and a pair of external electrodes 22 and 22 disposed on an outer surface of the element body 21. The element body 21 has a rectangular parallelepiped shape. The rectangular parallelepiped shape may include a shape in which corners and ridges are chamfered, and a shape in which corners and ridges are rounded. The element body 21 has a pair of end surfaces 21a and 21a in a longitudinal direction (refer to FIGS. 2 and 3), a pair of end surfaces 21b and 21b in a height direction, and a pair of end surfaces 21c and 21c in a width direction. A facing direction of the end surfaces 21a and 21a coincides with the X direction. A facing directions of the end surfaces 21b and 21b coincides with the Z direction. A facing direction of the end surfaces 21c and 21c is orthogonal to the first direction and the second direction and coincides with the Y direction.

The element body 21 is configured by stacking a plurality of dielectric layers in a predetermined direction. In the element body 21, a stacking direction of the plurality of dielectric layers coincides with the Y direction. Each of the dielectric layers is configured of a sintered body of a ceramic green sheet containing a dielectric material. Examples of the dielectric material include dielectric ceramics such as $BaTiO_3$-based, $Ba(Ti, Zr)O_3$-based, or $(Ba, Ca)TiO_3$-based. In an actual element body 21, each of the dielectric layers is integrated to such an extent that a boundary between the dielectric layers cannot be visually recognized.

Figure 4:
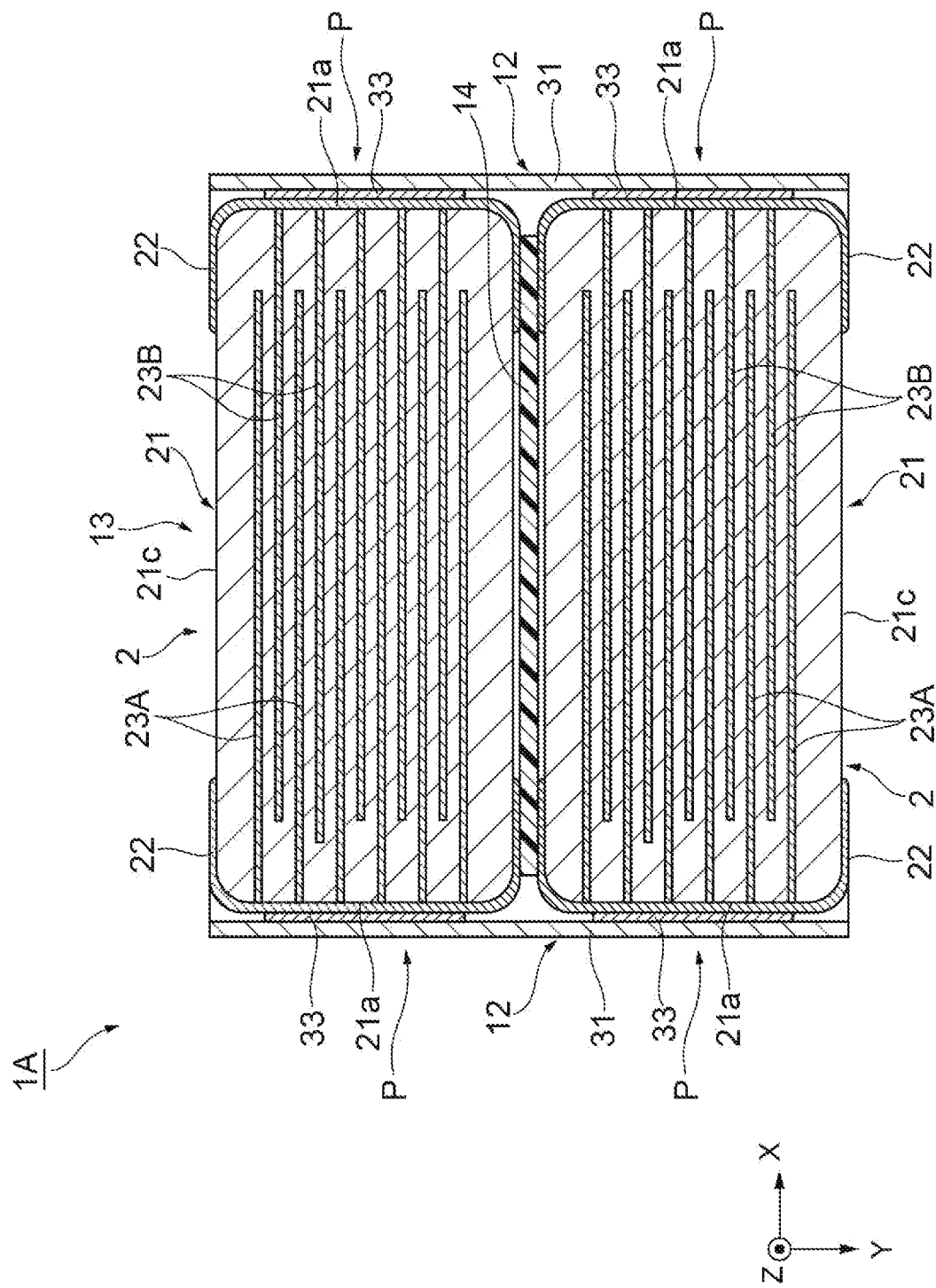
FIG. 4 is a cross-sectional view taken along line IV-IV in FIG. 2.

As shown in FIG. 4, a plurality of internal electrodes 23A and 23B are disposed inside the element body 21. For the internal electrodes 23A and 23B, a conductive material usually used as an internal electrode of a stacked electric element is used. The internal electrodes 23A and 23B are configured of a sintered body of a conductive paste containing a conductive material. Examples of the conductive material include base metals such as Ni and Cu. In the present embodiment, Ni is used as the conductive material.

The internal electrodes 23A and 23B have different electrical polarities from each other. In the element body 21, the internal electrodes 23A and 23B are alternately disposed in the Y direction at regular intervals. The internal electrodes 23A and 23B have facing portions that face each other in the Z direction. The internal electrode 23A is pulled out to one end surface 21a side and is exposed to the one end surface 21a. The internal electrode 23B is pulled out to the other end surface 21a side and is exposed to the other end surface 21a.

The pair of external electrodes 22 and 22 have different electrical polarities from each other. One of the external electrodes 22 and 22 is a positive electrode, and the other is a negative electrode. As shown in FIGS. 1 to 3, the external electrode 22 is provided to cover the end surface 21a of the element body 21. The external electrode 22 has electrode portions that protrude to the end surfaces 21b and 21b and the end surfaces 21c and 21c. That is, the external electrode 5 is centered on the end surface 3a and is formed over five surfaces including the end surfaces 21b and 21b and the end surfaces 21c and 21c. The electrode portions are connected to each other at a ridge portion of the element body 21 and are electrically connected to each other.

The electrode portion of the external electrode 22 that covers one end surface 21a is disposed to cover an exposed portion of the internal electrode 23 in the one end surface 21a. Similarly, the electrode portion of the external electrode 22 that covers the other end surface 21a is disposed to cover an exposed portion of the internal electrode 23 in the other end surface 21a. Thus, each of the internal electrodes 23A and 23B is electrically connected to the corresponding external electrode 5.

The external electrode 22 may include a first electrode layer on the element body 21 side and a second electrode layer on the side (the outer surface side) opposite to the element body 21. The first electrode layer may be formed, for example, by baking conductive paste applied to a surface of the element body 21. The first electrode layer is a sintered metal layer formed by sintering a metal component (metal powder) contained in the conductive paste. The first electrode layer may be a sintered metal layer made of Cu or a sintered metal layer made of Ni. As the conductive paste, a powder made of Cu or Ni mixed with a glass component, an organic binder, and an organic solvent can be used. The second electrode layer may be formed on the first electrode layer by, for example, a plating method. The second electrode layer may include, for example, a Ni plating layer formed on the first electrode layer and a Sn plating layer formed on the Ni plating layer.

In the array 13, the electronic components 2 and 2 are disposed in the Y direction so that one end surface 21c of one electronic component 2 and the other end surface 21c of the other electronic component 2 face each other via the insulating member 14. Further, the electronic components 2 and 2 are disposed so that positions of both ends in the X direction and positions of both ends in the Z direction coincide with each other.

The insulating member 14 is made of an insulating resin such as an epoxy resin. The insulating member 14 may be made of insulating plastic, ceramic, or glass. The insulating member 14 is, for example, an insulating film or an insulating sheet having a rectangular shape equivalent to that of the end surface 21c. The insulating member 14 is sandwiched between the electronic components 2 and 2 adjacent to each other in the arrangement direction and is in contact with each of the electronic components 2 and 2. The insulating member 14 may be adhered to at least one of the electronic components 2 and 2.

Both the pair of metal terminals 12 and 12 are formed of a conductive metal material to have a plate shape. Examples of the metal material include iron, nickel, copper, silver, and alloys containing them. The metal terminal 12 has a facing portion 31 that faces one of the external electrodes 22 and 22 in each of the electronic components 2 and 2, and a leg portion 32 provided to protrude further than the electronic component 2 in the Z direction.

The facing portion 31 has a rectangular shape having dimensions that overlaps the external electrodes 22 and 22 when seen in the X direction. A plurality of joint portions P to which the external electrodes 22 and 22 are joined are provided at the facing portion 31. Here, in the facing portion 31, a region in which a joint member 33 (refer to FIGS. 2 and 3) is disposed is defined as the joint portion P. In the present embodiment, as described above, the electronic components 2 and 2 are disposed in the Y direction in the array 13. Therefore, in the facing portion 31, two joint portions P and P are disposed in the Y direction.

The joint member 33 has conductivity and electrically connects the facing portion 31 to the external electrodes 22 and 22. As the joint member 33, for example, solder or a conductive adhesive can be used. As the conductive adhesive, for example, one configured of a resin such as a thermosetting resin and a conductive filler such as Ag can be used. As the thermosetting resin, for example, a phenol resin, an acrylic resin, a silicone resin, an epoxy resin, a polyimide resin and the like can be used.

In the present embodiment, solder is used as the joint member 33. For example, a pressing head 50 is used for soldering the metal terminal 12 and the electronic component 2 (refer to FIG. 8B or the like which will be described later). In this case, while the pressing head 50 is pressed against the outer surface 31b side of the facing portion 31, a solder paste 33A is heated via the facing portion 31. The pressing head 50 is, for example, a resistance heat generating portion, and the pressing head 50 itself generates heat to instantaneously heat the solder paste 33A. After the heating and pressing by the pressing head 50, the solder paste 33A is cooled and solidified, and thus the facing portion 31 and the external electrode 22 in the joint portion P are electrically connected.

A heating temperature by the pressing head 50 is not particularly limited and may be any temperature as long as the solder paste 33A can be melted. Further, it is preferable to continue the pressing by the pressing head 50 for a certain period even after the heating is stopped. Pressure of the pressing by the pressing head 50 is not particularly limited but may be, for example, about 0.01 MPa to 5 MPa.

A pair of upper and lower arm portions 34 and 35 which sandwich the electronic component 2 in the Z direction are provided on the facing portion 31. The arm portions 34 and 35 protrude from the facing portion 31 toward the electronic component 2 side in the X direction. The lower arm portion 34 is an arm portion on the leg portion 32 side. The arm portion 34 is provided at a lower portion of the facing portion 31 to be correspond to the lower end surface 21b of the element body 21 in the electronic component 2. A width of the lower arm portion 34 in the Y direction is smaller than a width of the electronic component 2 in the Y direction, for example. The lower arm portion 34 is formed by cutting a part of the facing portion 31 into a rectangular shape except for a lower side and bending a cut piece to the electronic component 2 side. Due to the bending of the cut piece, a rectangular through hole 38 (refer to FIG. 1) is formed in the facing portion 31. The lower arm portion 34 and the lower portion of the external electrode 22 of the electronic component 2 can be visually recognized from the through hole 38. Therefore, the through hole 38 can be used as a window for confirming a joint state between the electronic component 2 and the metal terminal 12 and a holding state of the electronic component 2 by the lower arm portion 34.

The upper arm portion 35 is an arm portion on the side opposite to the leg portion 32. The arm portion 35 is provided at an upper end of the facing portion 31 corresponding to the upper end surface 21b of the element body 21 in the electronic component 2. A width of the upper arm portion 35 in the Y direction is about the same as the width of the lower arm portion 35 in the Y direction. The arm portions 34 and 35 sandwich the electronic component 2 so that the electronic components 2 and 2 are held by the metal terminals 12 and 12. Tip end pieces 34a and 35a which open in the Z direction with respect to the base end side are respectively provided at tip ends of the arm portions 34 and 35. The tip end pieces 34a and 35a function as guides when the electronic component 2 is inserted into a space between the arm portions 34 and 35.

As shown in FIG. 1, at least one through hole 36 is provided in the facing portion 31 to correspond to the external electrode 22 of each of the electronic components 2 and 2. The through hole 36 is located, for example, in a central portion of the joint portion P. The through hole 36 is used, for example, for inserting the joint member 33 into a space between the facing portion 31 and the external electrode 22. Further, the through hole 36 is used for confirming the joint state between the joint portion P by the joint member 33 and the external electrode.

As shown in FIG. 1, a plurality of protrusions 37 which protrude to the external electrode 22 side are provided at the facing portion 31. Here, four protrusions 37 are provided on the upper, lower, left, and right sides of the through hole 36 to surround the through hole 36. The protrusions 37 reduce a contact area between the facing portion 31 and the external electrode 22, and transmission of vibration generated in the electronic component 2 to the metal terminal 12 (and the member to be connected that is connected via the metal terminal 12) is suppressed. Further, according to the protrusions 37, a gap corresponding to a protruding amount of the protrusions 37 can be provided between the facing portion 31 and the external electrode 22. Thus, the joint member 33 can be sufficiently filled between the facing portion 31 and the external electrode 22.

The leg portion 32 is a portion which is joined by soldering to the member to be connected. The leg portion 32 has an extending portion 41 that is continuous with the facing portion 31 and a bent portion 42 that bends from a tip end of the extending portion 41 to the electronic component 2 side. The extending portion 41 extends from a lower end of the facing portion 31 in the Z direction with the same width as the facing portion 31. A length of the extending portion 41 in the Z direction is not particularly limited, but in the present embodiment, it is longer than lengths of the arm portions 34 and 35 in the X direction.

As shown in FIG. 1, at least one slit 45 is provided in vicinity of a boundary between the facing portion 31 and the extending portion 41. The slit 45 extends in the Y direction corresponding to each of the electronic components 2 and 2. A width of the slit 45 in the Y direction is, for example, about the same as or slightly larger than a width of each of the arm portions 34 and 35 in the Y direction. A position of the slit 45 in the Z direction is lower than a position of the lower arm portion 34. The slit 45 suppresses creeping-up of the solder used for joining with the member to be connected from the leg portion 32 toward the facing portion 31. Due to the creeping-up of the solder being suppressed by the slit 45, it is possible to suppress formation of a bridge due to the solder between the leg portion 32 and the lower arm portion 34.

The bent portion 42 is a portion that ensures a sufficient joining area due to the solder when it is mounted on the member to be connected. In the present embodiment, as shown in FIGS. 1 and 2, the bent portion 42 is bent from a tip end of the extending portion 41 to the electronic component 2 side at an angle perpendicular to the extending portion 41. Therefore, the extending portion 41 and the bent portion 42 are L-shaped when seen in the Y direction. The bent portion 42 extends longer in the X direction than the arm portions 34 and 35, and the tip end of the bent portion 42 is located closer to a center of the electronic component 2 in the X direction than a tip end of each of the arm portions 34 and 35 (refer to FIG. 2).

The configuration of the metal terminal 12 described above will be described in more detail.

Figure 5:
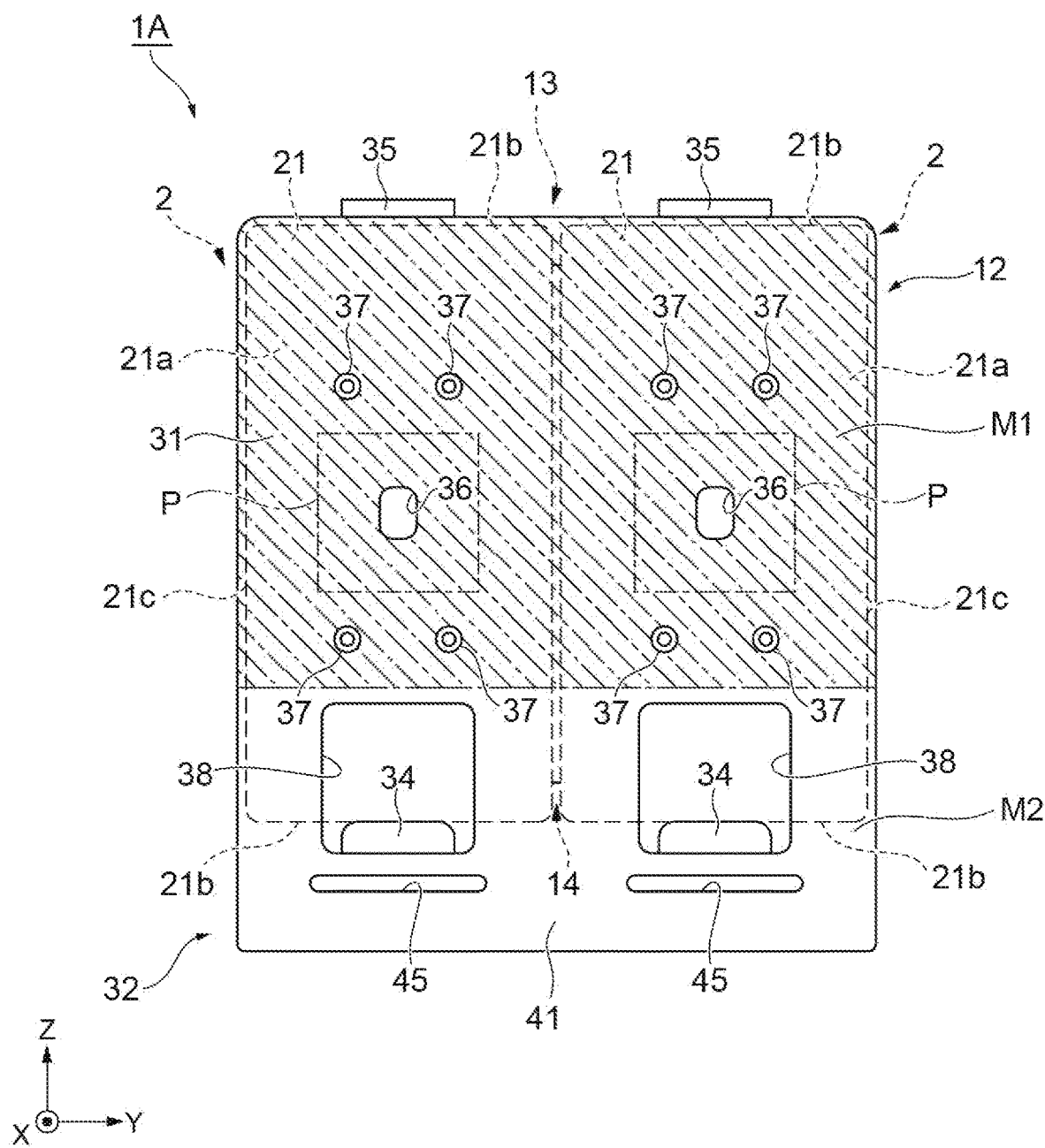
FIG. 5 is a side view showing a main part of the electronic component with a metal terminal according to the first embodiment.

FIG. 5 is a side view showing a main part of the electronic component with a metal terminal. The side view shown in FIG. 5 is a view of an electronic component 1A with a metal terminal when seen from one metal terminal 12 side in the X direction. Although only one metal terminal 12 is shown in FIG. 5, the other metal terminal 12 has the same configuration. As shown in the drawing, an easily deformable portion M1 that is more easily deformed than the other portions is provided at a part of the metal terminal 12. In the present embodiment, the easily deformable portion M1 extends in the Y direction to straddle the joint portions P and P at the facing portion 31 of the metal terminal 12. In the example of FIG. 5, the easily deformable portion M1 is provided on the entire facing portion 31, and the entire joint portions P and P are configured by the easily deformable portion M1.

Specifically, the easily deformable portion M1 is provided over the entire width of the facing portion 31 in the Y direction. The easily deformable portion M1 is provided in the Z direction over a position of an upper end of the facing portion 31 and a position between the protrusion 37 located below the through hole 36 and an upper side of the through hole 38. Due to the configuration of the easily deformable portion M1, the through hole 36 provided in the facing portion 31 is located in a region corresponding to the easily deformable portion M1. Further, the plurality of protrusions 37 provided on the facing portion 31 are all located in the region corresponding to the easily deformable portion M1.

The portions other than the easily deformable portion M1 are a hardly deformable portion M2 that is hardly deformed compared with the easily deformable portion M1. In the present embodiment, the hardly deformable portion M2 is configured to include the leg portion 32. In the example of FIG. 5, all the portions below the easily deformable portion M1 are the hardly deformable portions M2. That is, the hardly deformable portion M2 is provided over the entire portion including a portion of the facing portion 31 which constitutes the periphery of the through hole 38, the lower arm portion 34, and the leg portion 32.

The upper arm portion 35 may be the easily deformable portion M1 or the hardly deformable portion M2. For example, in the example of FIG. 6, in the pair of arm portions 34 and 35, the upper arm portion 35 is the easily deformable portion M1 together with the facing portion 31. The lower arm portion 34 is the hardly deformable portion M2 together with the leg portion 32.

The easily deformable portion M1 is made of a second metal material having a Young's modulus smaller than that of a first metal material constituting the hardly deformable portion M2. The first metal material can be selected from, for example, a material having a Young's modulus of 140 GPa or more. The second metal material can be selected from, for example, a material having a Young's modulus of less than 140 GPa. Examples of the first metal material include iron-based alloys. Examples of the second metal material include copper and copper-based alloys.

As shown in FIG. 7, examples of iron-based alloys include stainless steel and iron-nickel alloys (42 alloys). The Young's modulus of stainless steel is about 197 GPa, and the Young's modulus of iron-nickel alloy (42 alloys) is about 145 GPa. Examples of copper-based alloys other than copper include phosphor bronze and brass, as shown in FIG. 7. The Young's modulus of copper is about 129.8 GPa, and the Young's modulus of phosphor bronze is about 110 GPa. The Young's modulus of brass is about 98 GPa.

Figure 8A:
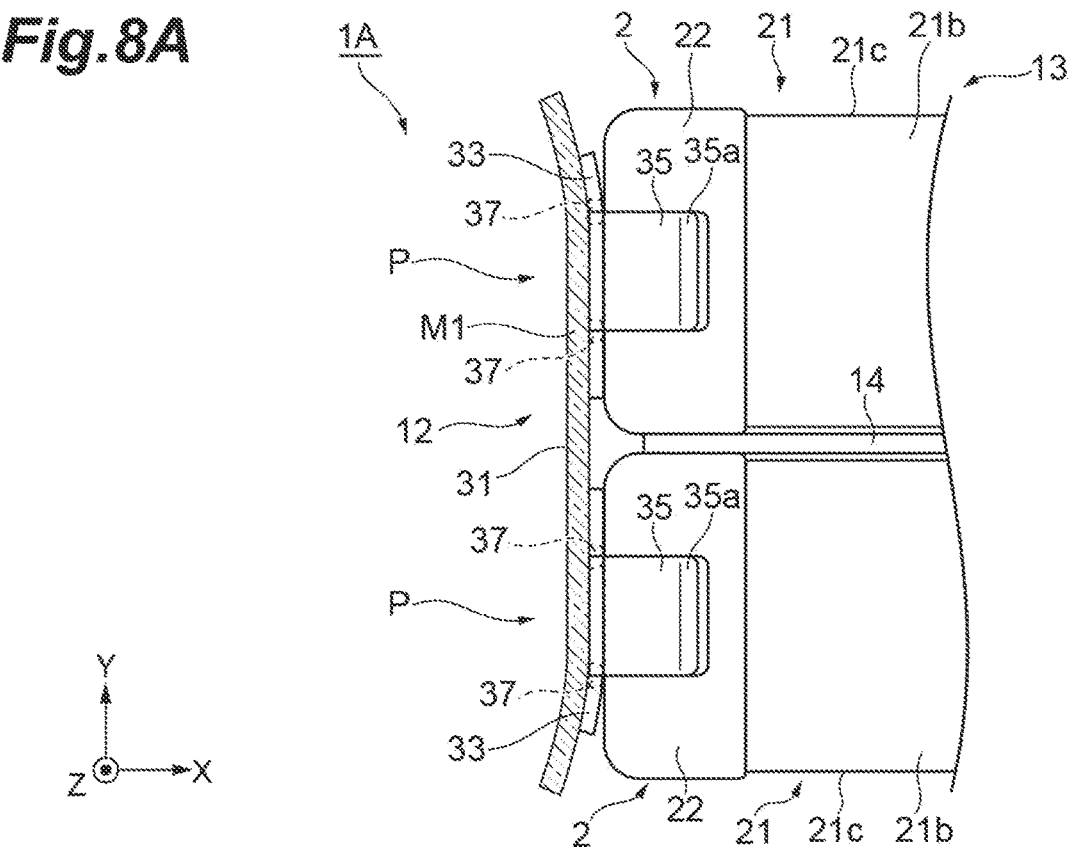
FIG. 8A is a side view showing an operation and effects of the electronic component with a metal terminal according to the first embodiment.

In the electronic component 1A with a metal terminal having the above-described configuration, when the electronic component 2 and the metal terminal 12 are joined, a shape of the joint portion P can be fitted to a shape of the external electrode 22 of the electronic component 2. When the electronic component 2 and the metal terminal 12 are joined, for example, as shown in FIG. 8A, it is considered that, in a frame constituting the metal terminal 12, bending occurs due to the application of stress when the electronic component 2 is fitted between the arm portions 34 and 35, or the like. In such a situation in which the bending occurs, the contact between the pressing head 50 and the joint portion P becomes insufficient, which may cause a poor joint between the electronic component 2 and the metal terminal 12.

Figure 8B:
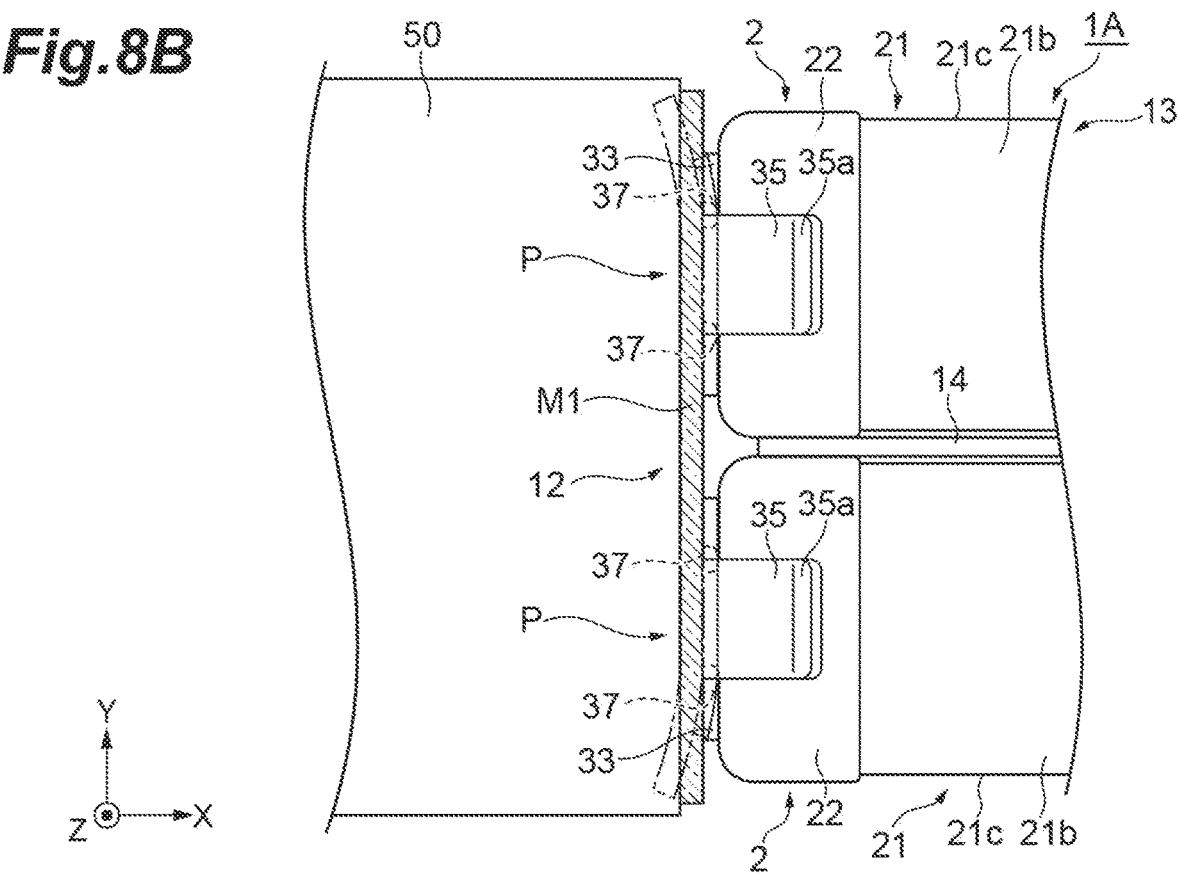
FIG. 8B is a side view showing the operation and effect of the electronic component with a metal terminal according to the first embodiment.

On the other hand, in the electronic component 1A with a metal terminal, as described above, the easily deformable portion M1 that extends in the Y direction is provided in the facing portion 31 of the metal terminal 12 to straddle the plurality of joint portions P and P. Therefore, in the electronic component 1A with a metal terminal, as shown in FIG. 8B, the easily deformable portion M1 that straddles the plurality of joint portions P and P can be deformed according to the shape of the external electrode 22 of the electronic component 2 by heating and pressing of the pressing head 50. Therefore, in the electronic component 1A with the metal terminal, even when bending of the frame constituting the metal terminal 12 occurs, the pressing head 50 and the joint portion P can be firmly brought into contact with each other, and it is possible to suppress a poor joint between the electronic component 2 and the metal terminal 12.

Figure 9A:
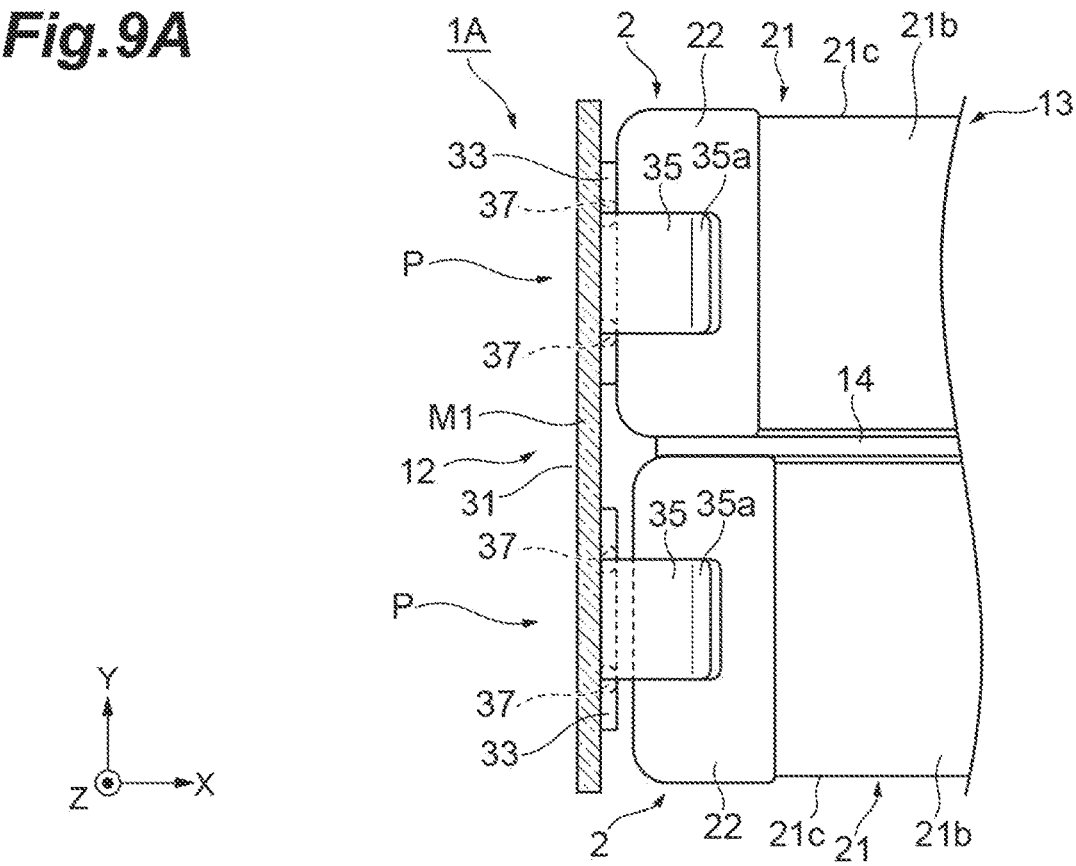
FIG. 9A is a side view showing other operation and effects of the electronic component with a metal terminal according to the first embodiment.

Further, when the electronic component 2 and the metal terminal 12 are joined, as shown in FIG. 9A, it is conceivable that dimensions in the X direction vary among the electronic components 2 and 2 constituting the array 13. In this case, in performing the heating and pressing by the pressing head 50, the contact between the pressing head 50 and the joint portion P becomes insufficient with respect to the electronic component 2 of which the dimension in the X direction is smaller than that of the other electronic component 2, which may cause a poor joint between the electronic component 2 and the metal terminal 12.

Figure 9B:
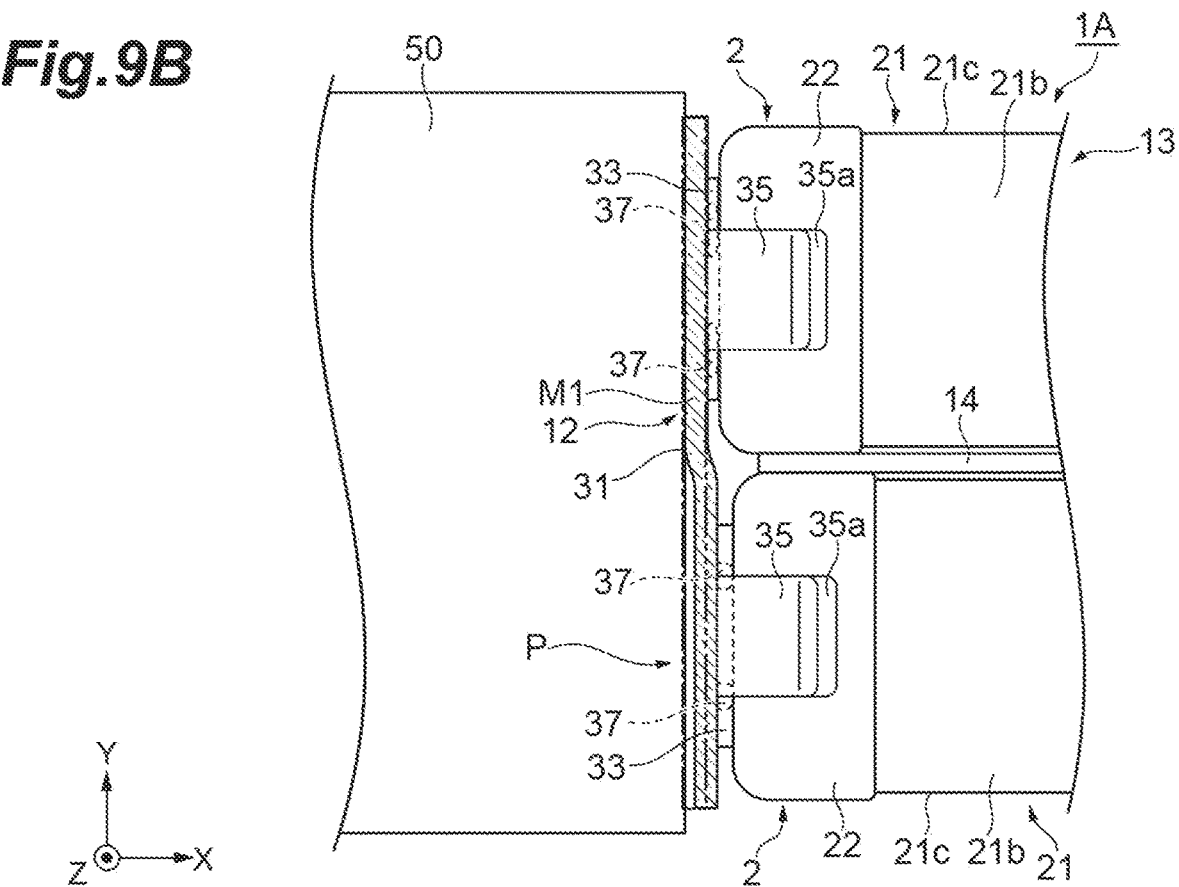
FIG. 9B is a side view showing another operation and effect of the electronic component with a metal terminal according to the first embodiment.

On the other hand, in the electronic component 1A with a metal terminal, as shown in FIG. 9B, the easily deformable portion M1 that straddles the plurality of joint portions P and P can be deformed according to the shape of the external electrode 22 of the electronic component 2 by the heating and pressing of the pressing head 50. Therefore, in the electronic component 1A with a metal terminal, even when the dimensions in the X direction vary among the electronic components 2 and 2 constituting the array 13, the pressing head 50 and the joint portion P can be firmly brought into contact with each other, and it is possible to suppress a poor joint between the electronic component 2 and the metal terminal 12.

In the present embodiment, the metal terminal 12 has at least one protrusion 37 that protrudes in the X direction toward the electronic component 2 side in the region corresponding to the easily deformable portion M1. Therefore, as shown in FIG. 9B, since the protrusion 37 is crushed when the pressing head 50 heats and presses the electronic component 2 of which the dimension in the X direction is larger than that of the other electronic component 2, the shape of the joint portion P can be more reliably fitted to the shape of the external electrode 22 of the electronic component 2. Therefore, it is possible to more effectively suppress the poor joint between the electronic component 2 and the metal terminal 12.

On the other hand, in the present embodiment, the hardly deformable portion M2 in the metal terminal 12 is configured to include the leg portion 32. Thus, strength of the metal terminal 12 can be sufficiently maintained even when the above-described easily deformable portion M1 is provided. Therefore, it is possible to suppress deformation of the metal terminal 12 when the electronic component 1A with a metal terminal is connected to the member to be connected.

Figure 6:
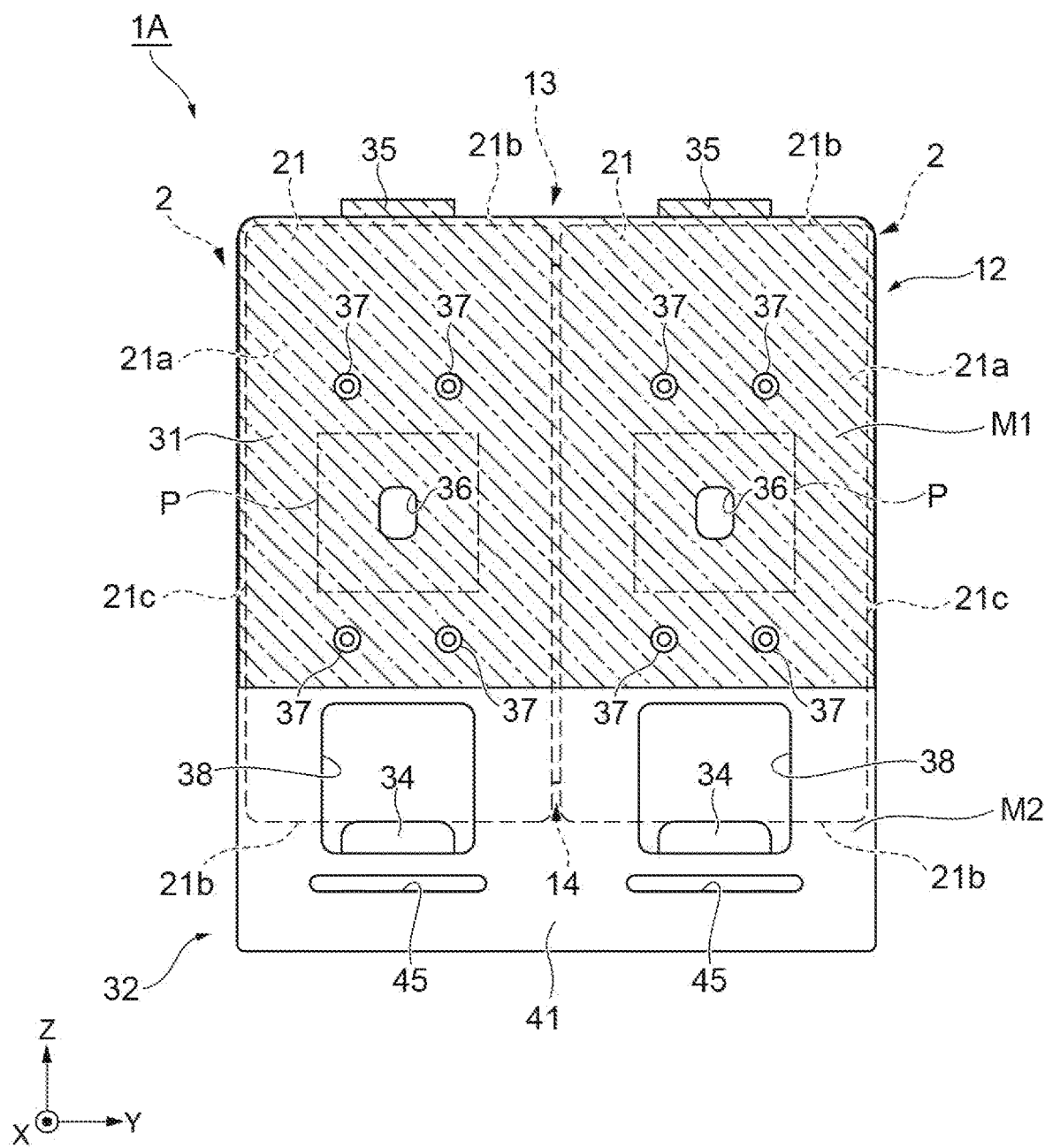
FIG. 6 is a side view showing another example of FIG. 5.

In the aspect of FIG. 6, in the metal terminal 12, the upper arm portion 35 is the easily deformable portion M1 together with the facing portion 31. Since the arm portion 35 is served as the easily deformable portion M1, the shape of the joint portion P can be reliably fitted to the shape of the external electrode 22 of the electronic component 2 even when the arm portion 35 is provided. Further, in the aspect of FIG. 6, in the metal terminal 12, the lower arm portion 34 is the hardly deformable portion M2 together with the leg portion 32. Thus, even when the arm portion 34 is the easily deformable portion M1, the electronic component 2 can be firmly sandwiched by the arm portions 34 and 35.

In the present embodiment, the metal terminal 12 has at least one through hole 36 that exposes a part of the external electrode 22 joined to the joint portion P in the region corresponding to the easily deformable portion M1. Thus, whether or not the shape of the joint portion P is fitted to the shape of the external electrode 22 of the electronic component 2 can be visually recognized through the through hole 36.

In the present embodiment, the Young's modulus of the first metal material constituting the hardly deformable portion M2 is 140 GPa or more, and the Young's modulus of the second metal material constituting the easily deformable portion M1 is less than 140 GPa. The first metal material is an iron-based alloy, and the second metal material is copper or a copper-based alloy. Thus, it is possible to easily ensure both the amount of deformation of the easily deformable portion M1 and the strength of the metal terminal 12.

Figure 10A:
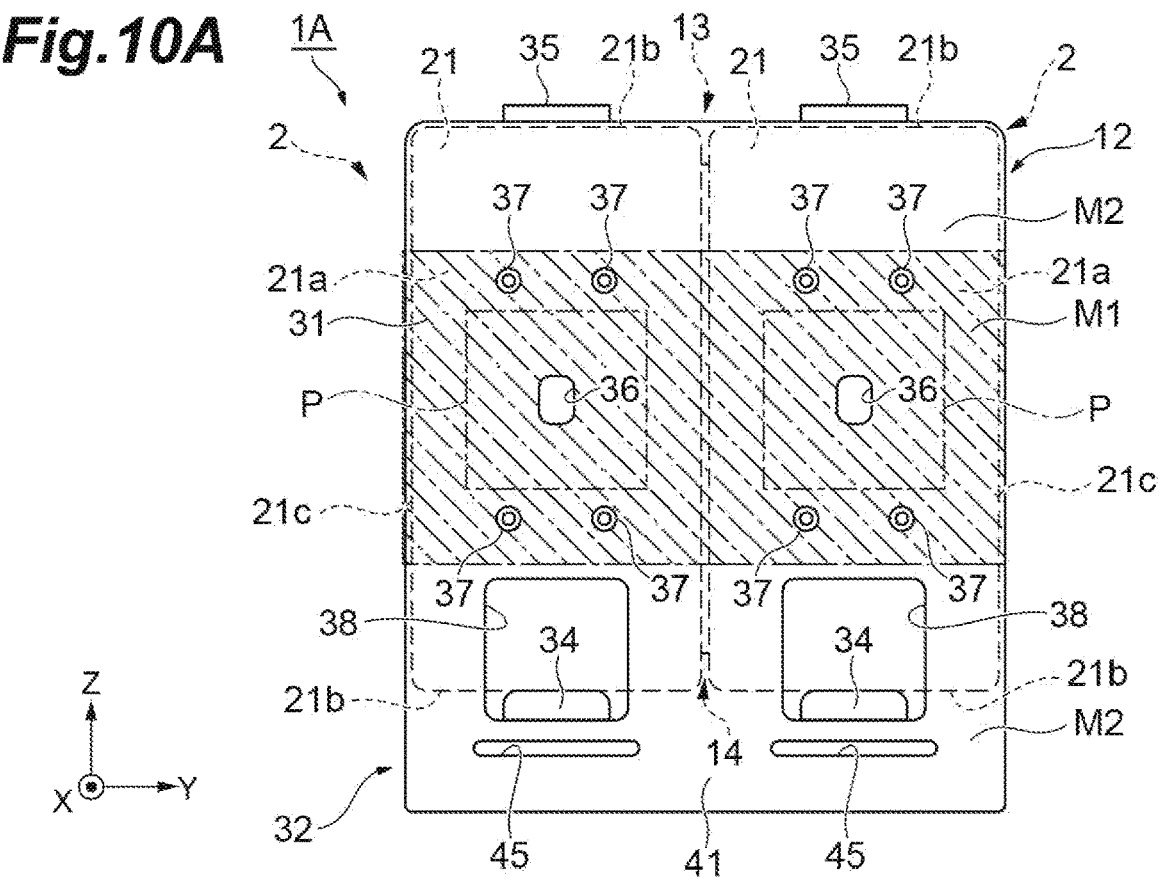
FIG. 10A is a side view showing a main part of an electronic component with a metal terminal according to a modified example of the first embodiment.
Figure 10B:
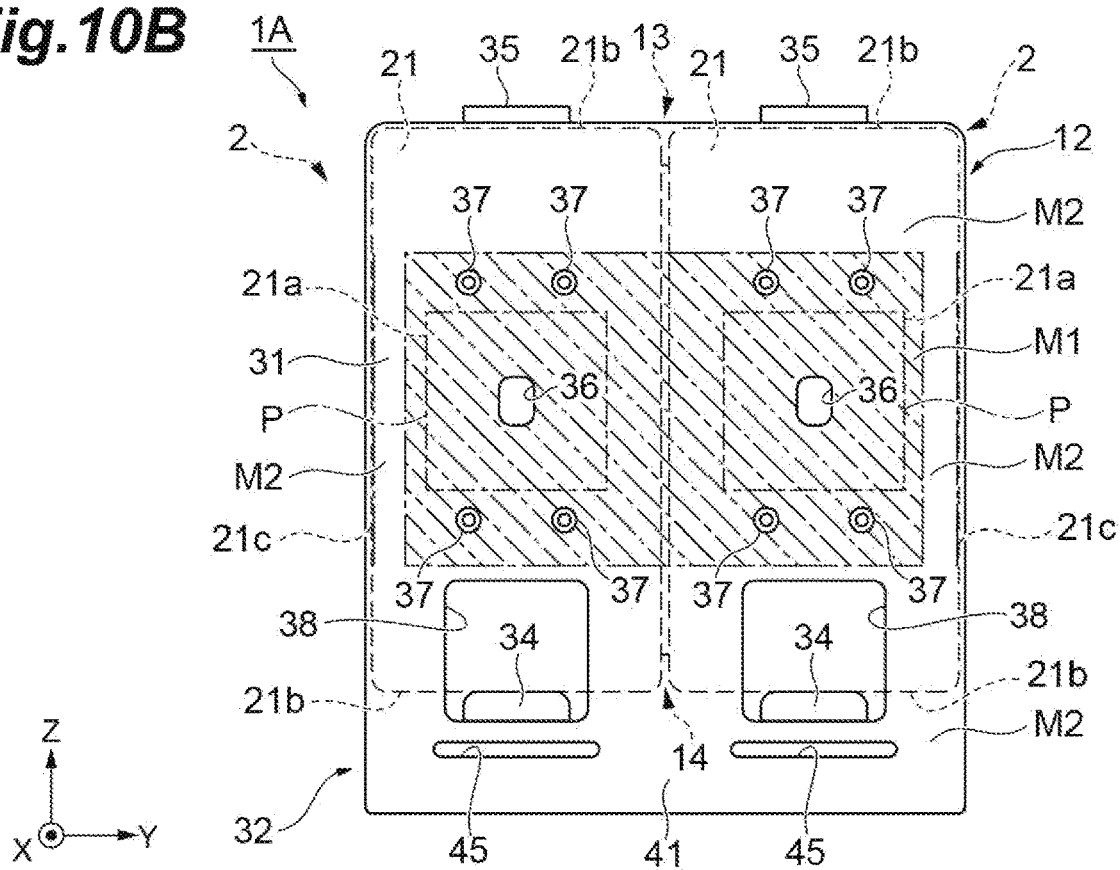
FIG. 10B is a side view showing a main part of the electronic component with a metal terminal according to the modified example of the first embodiment.

Various modifications can be applied to the electronic component 1A with a metal terminal according to the first embodiment. For example, the easily deformable portion M1 may extend in the Y direction to straddle the joint portions P and P and may not extend up to the position of the upper end of the facing portion 31 in the Z direction, as shown in FIG. 5. In this case, for example, as shown in FIG. 10A, an upper end of the easily deformable portion M1 may be located between the upper end of the facing portion 31 and the protrusion 37 located above the through hole 36. Further, as shown in FIG. 5, the easily deformable portion M1 does not necessarily extend over the entire width of the facing portion 31 in the Y direction. For example, as shown in FIG. 10B, both edges of the facing portions 31 in the Y direction may be the hardly deformable portions M2.

Second Embodiment

Figure 11:
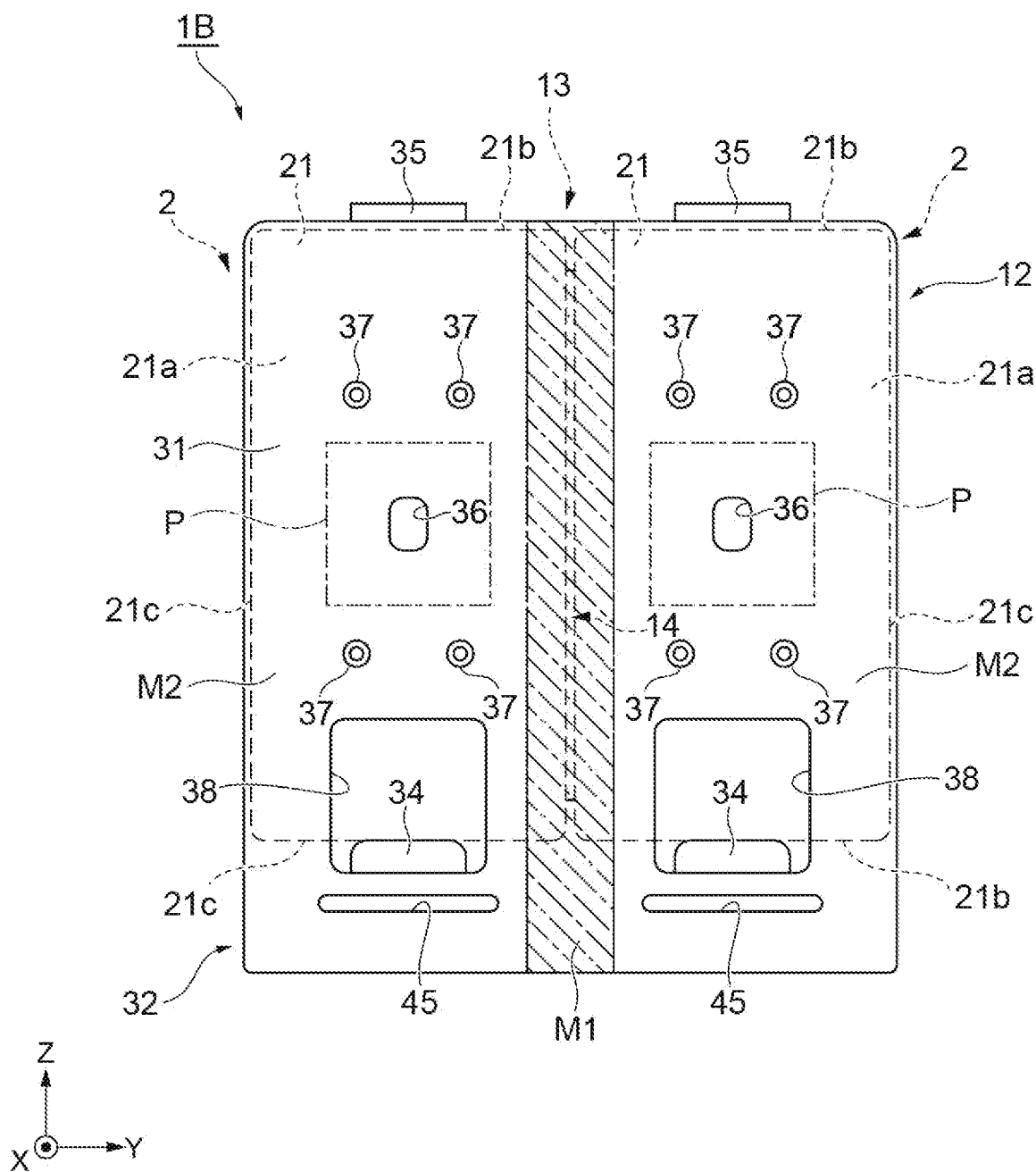
FIG. 11 is a side view showing a main part of an electronic component with a metal terminal according to a second embodiment.

FIG. 11 is a side view showing a main part of an electronic component with a metal terminal according to a second embodiment. As shown in the drawing, the electronic component 1B with a metal terminal according to the second embodiment is different from the first embodiment in the configuration of the easily deformable portion M1 in the metal terminal 12.

Specifically, in the electronic component 1B with a metal terminal, the easily deformable portion M1 extends in the Z direction along a boundary between the electronic components 2 and 2. In the example of FIG. 11, the easily deformable portion M1 is provided at equal width to the left and right with respect to the boundary (an arrangement portion of the insulating member 14) R of the electronic components 2 and 2 in the Y direction. The easily deformable portion M1 is disposed not to overlap the joint portions P and P when seen in the X direction, for example. That is, the width of the easily deformable portion M1 in the Y direction is so that, when seen in the X direction, it overlaps with edge portions of the electronic components 2 and 2 on the boundary R side and does not overlap the protrusion 37 and the through hole 38 on the boundary R side. The easily deformable portion M1 is provided over the position of the upper end of the facing portion 31 and the position of the lower end of the extending portion 41 in the leg portion 32 in the Z direction.

The portions other than the easily deformable portion M1 are the hardly deformable portion M2 as in the first embodiment. Also in the present embodiment, the hardly deformable portion M2 is configured to include the leg portion 32. In the example of FIG. 11, in the facing portion 31 and the leg portion 32, all portions outside the easily deformable portion M1 in the Y direction are the hardly deformable portions M2. The bent portion 42 on the extension of the easily deformable portion M1 may be the easily deformable portion M1 or the hardly deformable portion M2.

Figure 12A:
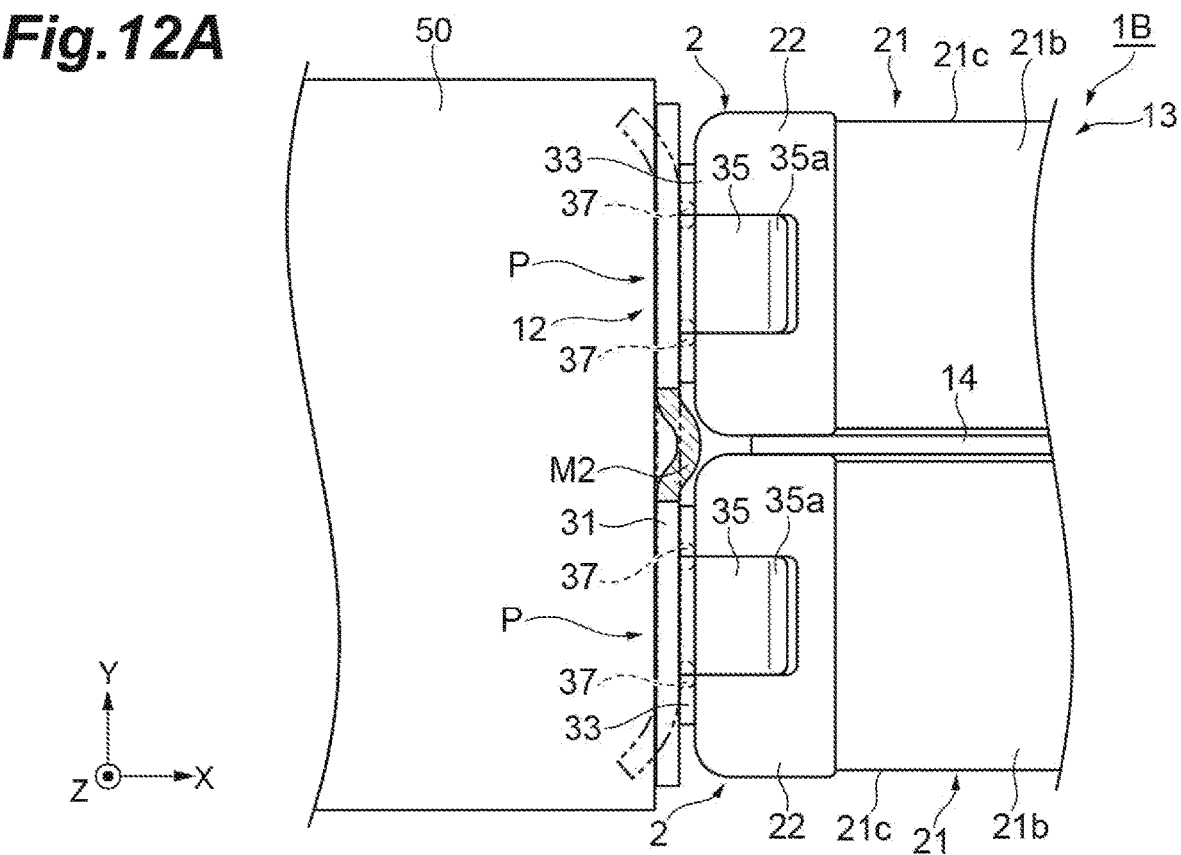
FIG. 12A is a side view showing an operation and effect of the electronic component with a metal terminal according to the second embodiment.

Also in such an electronic component 1B with a metal terminal, as shown in FIG. 12A, even when bending of the frame constituting the metal terminal 12 occurs, the easily deformable portion along the boundary R between the electronic components 2 and 2 is deformed by the heating and pressing of the pressing head 50, and the shape of the joint portion P can be fitted to the shape of the external electrode 22 of the electronic component 2. Therefore, the pressing head 50 and the joint portion P can be firmly brought into contact with each other, and it is possible to suppress a poor joint between the electronic component 2 and the metal terminal 12.

Figure 12B:
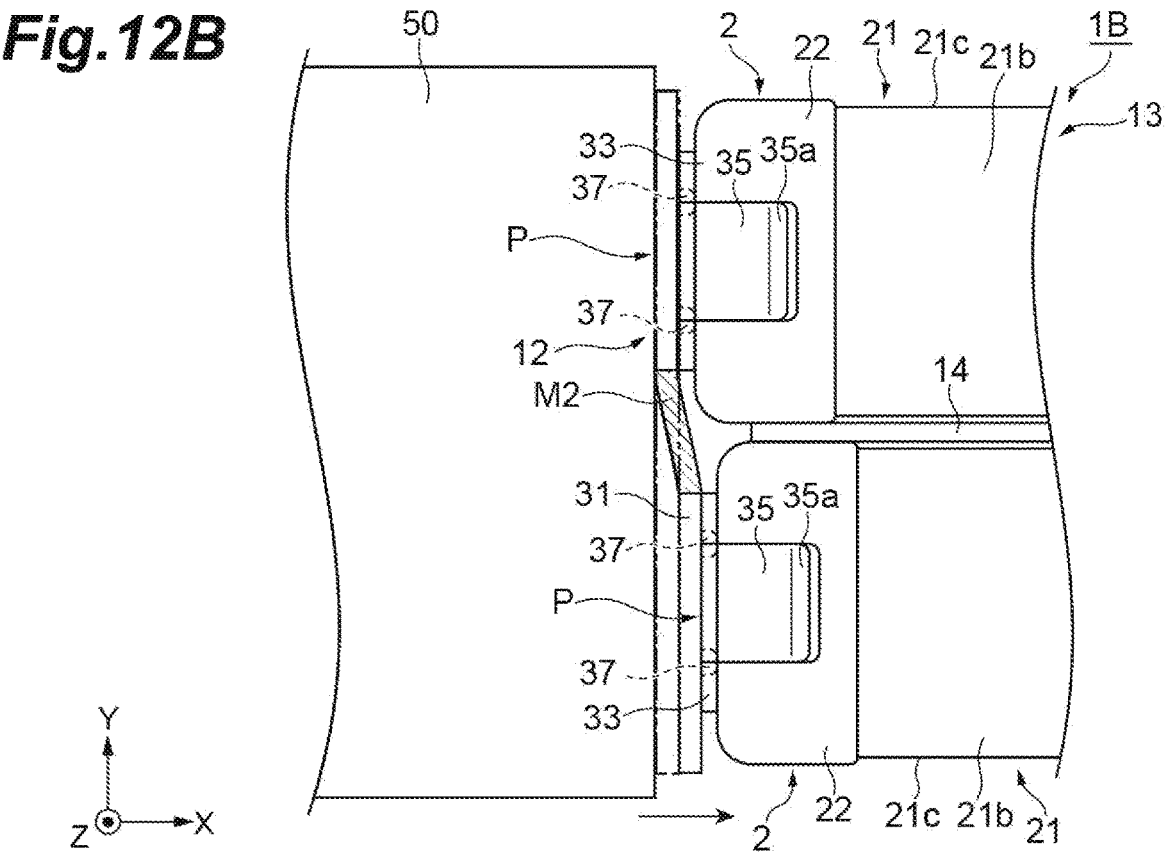
FIG. 12B is a side view showing the operation and effect of the electronic component with a metal terminal according to the second embodiment.

Further, as shown in FIG. 12B, even when the dimensions in the X direction vary between the electronic components 2 and 2, the easily deformable portion M1 along the boundary R between the electronic components 2 and 2 is deformed by the heating and pressing of the pressing head 50, and the shape of the joint portion P can be fitted to the shape of the external electrode 22 of the electronic component 2. Therefore, the pressing head 50 and the joint portion P can be firmly brought into contact with each other, and it is possible to suppress a poor joint between the electronic component 2 and the metal terminal 12.

OTHER MODIFIED EXAMPLES

Figure 13:
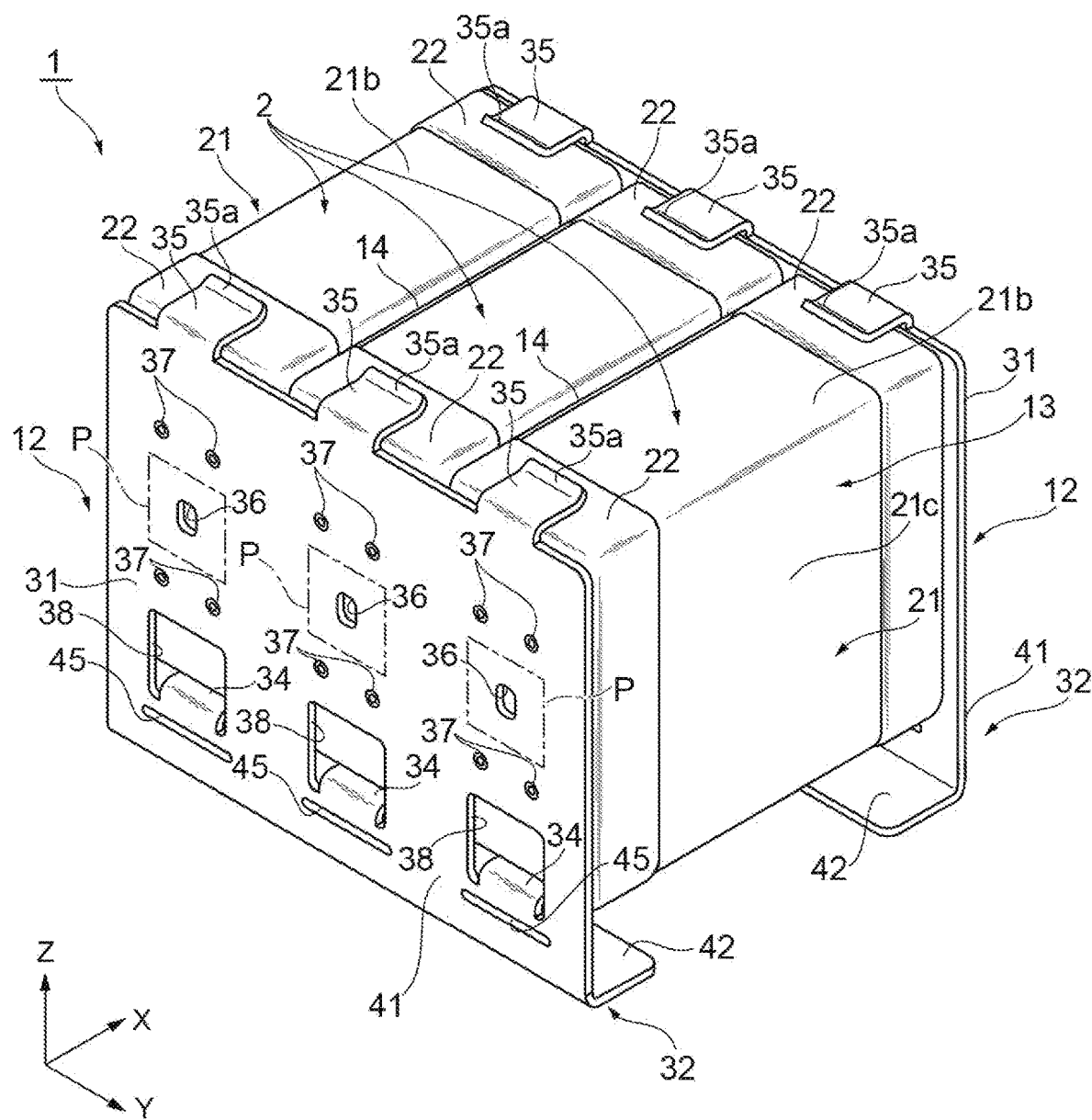
FIG. 13 is a perspective view of an electronic component with a metal terminal according to a modified example.

In the above embodiment, although the array 13 is configured of two electronic components 2, the number of electronic components 2 constituting the array 13 is not limited thereto. For example, as shown in FIG. 13, in the metal terminal 12 of the electronic component 1 with a metal terminal in which the array 13 is configured of three electronic components 2, the easily deformable portion M1 and the hardly deformable portion M2 shown in FIGS. 5, 6, 9A, and 9B or the easily deformable portion M1 and the hardly deformable portion M2 shown in FIGS. 10A and 10B may be applied.

In the array 13 configured of the three electronic components 2, it is considered that the dimensions in the X direction are more likely to vary among the electronic components 2 than in the array 13 configured of the two electronic components 2. On the other hand, due to the above-described configurations of the easily deformable portion M1 and the hardly deformable portion M2 being applied, even when the number of arrangements of the electronic components 2 is increased, the pressing head 50 and the joint portion P can be firmly brought into contact with each other, and it is possible to suppress a poor joint between the electronic component 2 and the metal terminal 12. The number of electronic components 2 constituting the array 13 may be four or more.

Further, in the above embodiment, the stacked capacitor is exemplified as the electronic component 2, but the electronic component to which the present disclosure is applicable is not limited to the stacked capacitor. For example, the present disclosure can be applied to stacked electronic components such as stacked inductors, stacked varistors, stacked piezoelectric actuators, stacked thermistors, and stacked composite components, and electronic components other than the stacked electronic components.

What is claimed is:

1. An electronic apparatus comprising:
a plurality of electronic components each including an element body and a pair of external electrodes provided on each of a pair of end surfaces facing each other in a first direction in the element body, and disposed in a second direction orthogonal to the first direction; and
a pair of plate-shaped metal terminals each including a plurality of joint portions to which external electrodes of the plurality of electronic components are joined, and a leg portion provided to protrude further than each of the plurality of electronic components in a third direction intersecting the first direction and the second direction,
wherein a portion of each of the metal terminals that extends in the second direction to straddle the plurality of joint portions is an easily deformable portion made of a second metal material having a Young's modulus smaller than a Young's modulus of a first metal material constituting an other portion of each of the metal terminals.

2. The electronic apparatus according to claim 1, wherein the metal terminal has at least one protrusion that protrudes in the first direction toward an electronic component side in a region corresponding to the easily deformable portion.

3. The electronic apparatus according to claim 1, wherein each of the metal terminals has at least one through hole in a region corresponding to the easily deformable portion to expose a part of the external electrode bonded to the joint portion.

4. The electronic apparatus according to claim 1, wherein the metal terminal has a pair of arm portions that sandwich the plurality of electronic components in the third direction, and
an arm portion of the pair of arm portions that is located on a side opposite to the leg portion is made from the second metal material.

5. The electronic apparatus according to claim 1, wherein the leg portion is a part of the other portion and is made from the first metal material.

6. The electronic apparatus according to claim 1, wherein the Young's modulus of the first metal material is 140 GPa or more, and the Young's modulus of the second metal material is less than 140 GPa.

7. The electronic apparatus according to claim 1, wherein the first metal material is an iron-based alloy, and the second metal material is copper or a copper-based alloy.

8. An electronic apparatus comprising:
a plurality of electronic components each including an element body and a pair of external electrodes provided on each of a pair of end surfaces facing each other in a first direction in the element body, and disposed in a second direction orthogonal to the first direction; and a pair of plate-shaped metal terminals each including a plurality of joint portions to which external electrodes of the plurality of electronic components are joined, and a leg portion provided to protrude further than each of the plurality of electronic components in a third direction intersecting the first direction and the second direction, wherein a portion of each of the metal terminals that extends in the third direction along a boundary between the plurality of electronic components is an easily deformable portion made of a second metal material having a Young's modulus smaller than a Young's modulus of a first metal material constituting an other portion of each of the metal terminals.

9. The electronic component with a metal terminal according to claim 2, wherein the leg portion is a part of the other portion and is made from the first metal material.

10. The electronic apparatus according to claim 8, wherein the Young's modulus of the first metal material is 140 GPa or more, and the Young's modulus of the second metal material is less than 140 GPa.

11. The electronic apparatus according to claim 8, wherein the first metal material is an iron-based alloy, and the second metal material is copper or a copper-based alloy.

* * * * *